United States Patent [19]

Oury

[11] 4,117,920
[45] Oct. 3, 1978

[54] AUGER HOPPER

[75] Inventor: Robert F. Oury, Elmhurst, Ill.

[73] Assignee: Rotec Industries, Elmhurst, Ill.

[21] Appl. No.: 773,550

[22] Filed: Mar. 2, 1977

[51] Int. Cl.² ............................................. B65G 47/18
[52] U.S. Cl. .................................... 198/311; 198/302; 214/83.32
[58] Field of Search .............. 198/302, 311, 540, 547, 198/558, 562, 616, 669, 670–672, 511, 513, 313, 632, 657, 674, 672, 719, 722, 518; 222/608, 412, 413; 172/33, 419, 427; 214/17 D, 83.32; 259/178 R; 366/50, 64, 186

[56] References Cited

U.S. PATENT DOCUMENTS

| 2,600,588 | 6/1952  | Stodolka et al. | 198/311 |
| 2,975,884 | 3/1961  | Kayser          | 198/302 |
| 3,470,681 | 10/1969 | Saemann         | 198/511 |
| 3,598,224 | 8/1971  | Oury            | 198/302 |
| 3,688,827 | 9/1972  | Ryan            | 222/412 |
| 3,765,526 | 10/1973 | Hubbard et al.  | 198/672 |
| 3,794,046 | 2/1974  | Muijs           | 198/657 |
| 3,854,572 | 12/1974 | Maiste          | 198/511 |
| 3,967,913 | 7/1976  | Gabriel         | 198/669 |

FOREIGN PATENT DOCUMENTS 1,083,458  9/1967  United Kingdom .................... 198/547

Primary Examiner—Joseph E. Valenza
Attorney, Agent, or Firm—Allegretti, Newitt, Witcoff & McAndrews

[57] ABSTRACT

An auger hopper for transferring cementious material or the like from a supply source such as a cement truck or dump truck to a conveyor belt. A hopper is provided together with a frame for permitting the hopper to straddle and attach to the conveyor. An auger is floatably mounted for rotation within and near the bottom of the hopper. The hopper and conveyor are movably mounted on wheels. Means for mounting at least one of the wheels is provided by which the attitude of at least one wheel mounting means may be varied in relation to the hopper and conveyor. The auger operates to drive cementious materials from the ends of the hopper toward the center and then to discharge the cementious material through a discharge opening at the bottom and onto the conveyor belt without plugging the hopper.

10 Claims, 7 Drawing Figures

AUGER HOPPER

BACKGROUND OF THE INVENTION

In the past, hoppers have been provided for transferring concrete from a cement truck to a conveyor. However, these hoppers have met with difficulty in that they have jammed and plugged with concrete as it enters the small opening of the hopper provided for depositing the concrete on a conveyor belt for distribution. Also, prior hoppers have not readily permitted ground level operation and mobility of the conveyor. Prior conventional concrete hoppers have not provided means for suspending the conveyor within and under the hopper to maintain the hopper low enough to receive discharge from a standard type truck. Also, traditional concrete hoppers have been aligned with the direction of belt travel making discharge into the hopper at a low, uniform level impossible due to the angle of repose of concrete within the hopper.

Accordingly, it is an object of the present invention to provide a new and improved hopper for cementious material and the like which is economical to construct and efficient in operation. It is also an object of the present invention to provide such a hopper having a two part auger blade to drive cementious material from both ends of the hopper toward the discharge opening so as to avoid jamming and plugging and the like.

One of the main advantages of the present invention is the provision of a concrete hopper having the auger floatably mounted for rotation within the hopper so that lumps such as rocks in the concrete which may tend to lodge between the auger blade and hopper will not cause jamming of the auger. A further object of the present invention is to provide a hopper which may be readily connected to and disconnected from the conveyor.

Yet another object of this invention is to provide an auger hopper which may be readily substituted for a conventional hopper. These and other objects of the present invention will be more fully understood by reference to the following detailed description of the preferred embodiment.

SUMMARY OF THE INVENTION

The present invention is generally related to an auger hopper for use with cementious material and the like. An elongate hopper is provided, generally of V-shape in cross section, having an input portion and a discharge portion substantially narrower than the input portion. A discharge opening is provided mid way between the end walls of the hopper at the bottom of the hopper and an auger, having a shaft and an auger screw blade, is rotatably mounted within the hopper and journaled within longitudinal channels defined in the end walls of the hopper. A power source is provided on the hopper for operating a drive shaft which is connectable to the auger shaft and arms, pivotally connected to rotate about the axis of rotation of the drive shaft, floatably mount the auger shaft within bearings connected to the arms.

A frame is provided for permitting the hopper to straddle the conveyor. Mounting legs are provided on the hopper for centering the hopper directly over the conveyor and for connecting it thereto.

DETAILED DESCRIPTION OF THE PREFERRED EMBODIMENTS

Figure 1:
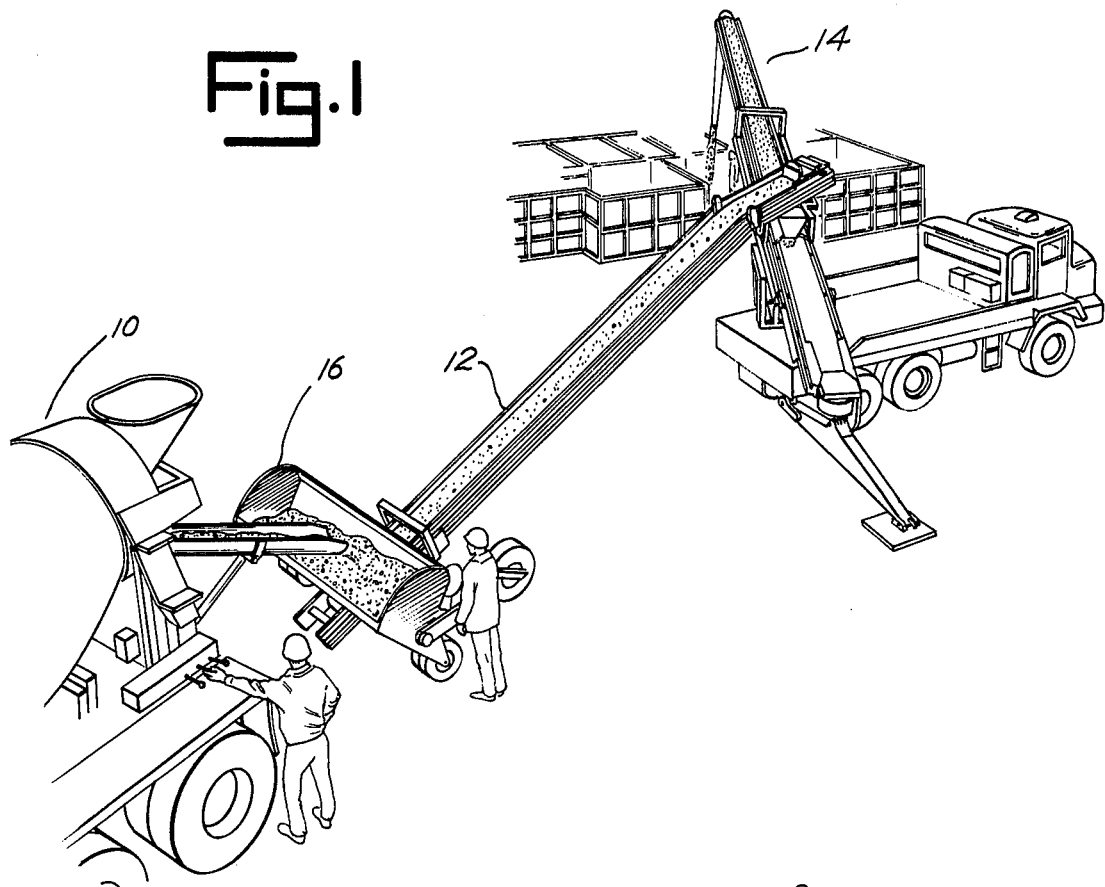
FIG. 1 is a perspective view of the auger hopper of the present invention delivering concrete from a cement truck to a concrete conveyor.
Figure 2:
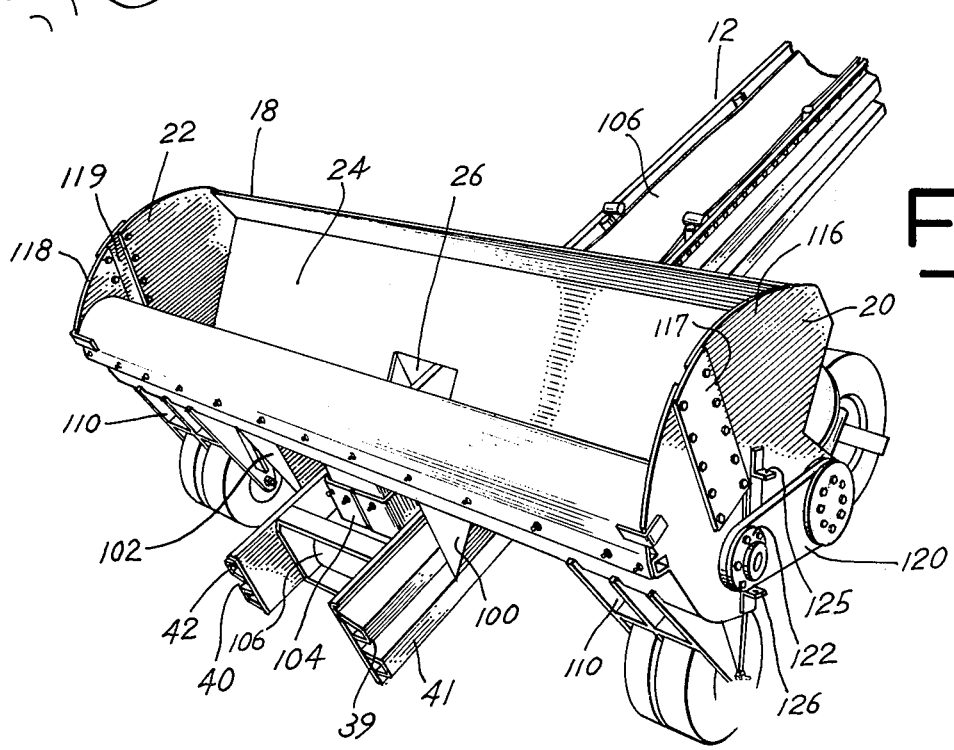
FIG. 2 is a perspective drawing of the auger hopper and a portion of the conveyor with which it is adapted to be used.
Figure 3:
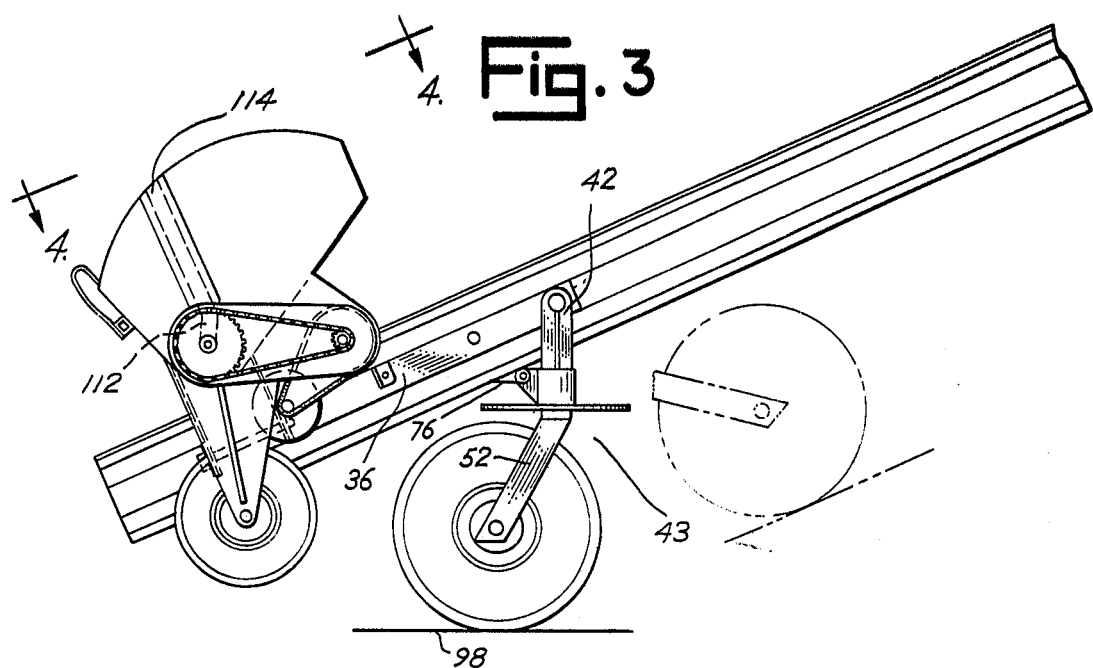
FIG. 3 is a side view of the auger hopper and conveyor of FIG. 2.
Figure 4:
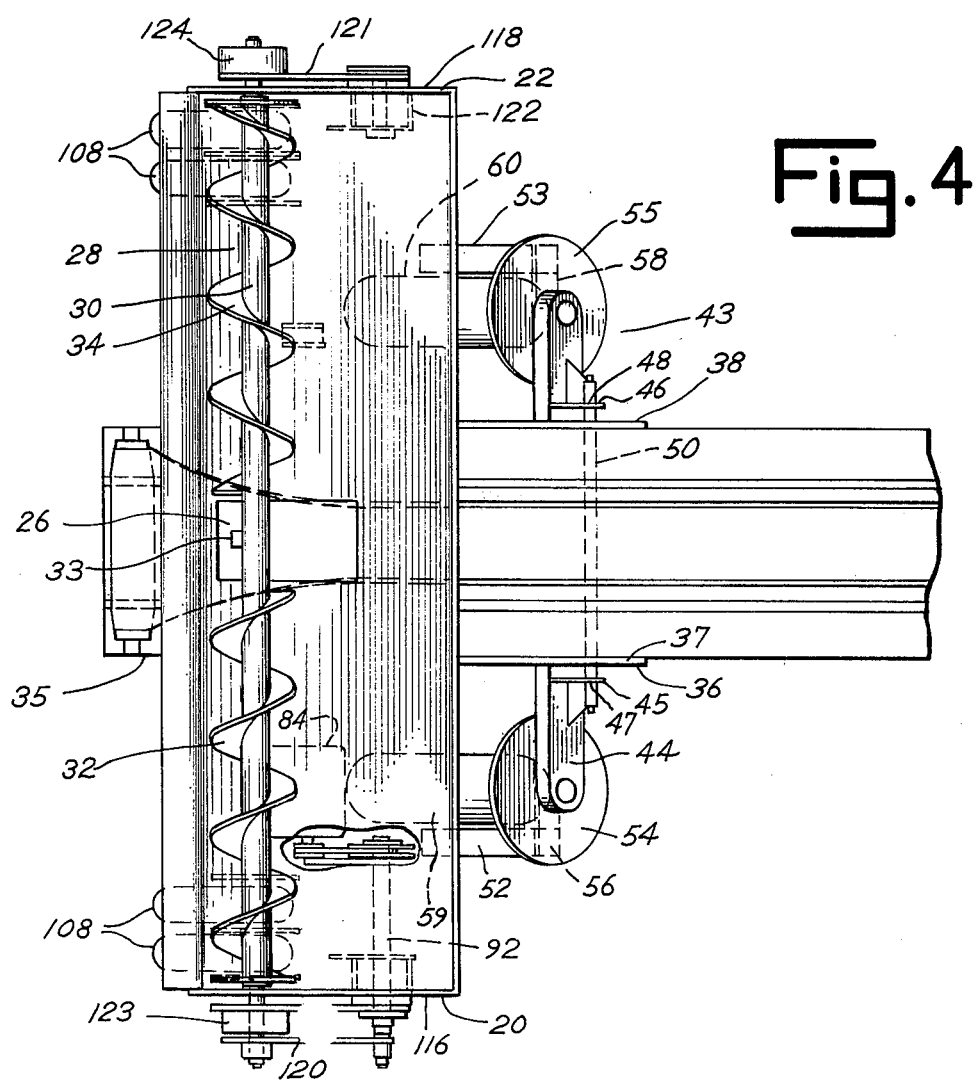
FIG. 4 is a top view of the auger hopper and conveyor shown in FIG. 3.
Figure 5:
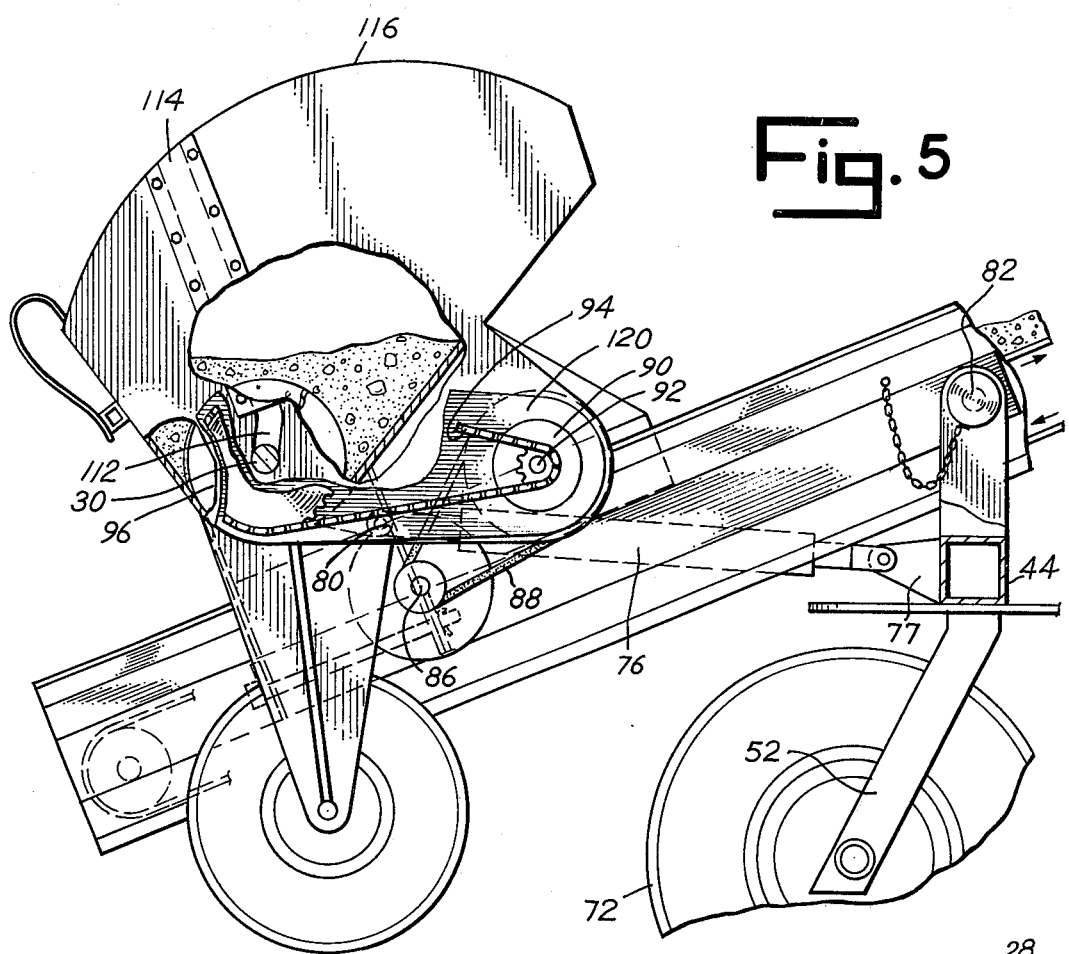
FIG. 5 is an expanded partial side cross-sectional view of the hopper and conveyor of FIG. 3.
Figure 6:
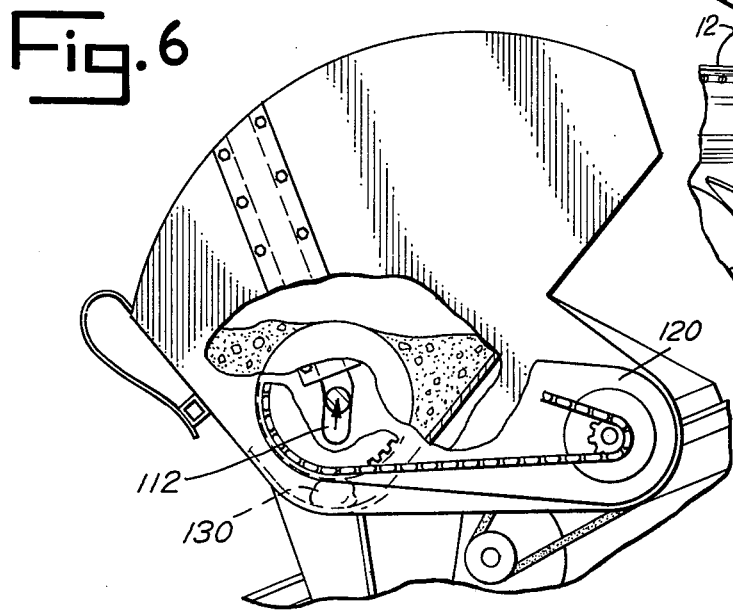
FIG. 6 is a further expanded side cross-sectional view of the hopper and drive mechanism shown in FIG. 5.

The device of this invention is adapted for delivering cementious material such as concrete from a supply source such as a cement truck 10 to a conveyor 12 for further delivery to a concrete placement device 14. The delivery device of this invention is an auger hopper 16 having a generally V-shaped cross-sectional area as shown in FIGS. 3, 5, and 6. Referring now to FIGS. 2, 3, and 4, the auger hopper device 16 includes a hopper 18, having end walls 20 and 22 and a downwardly converging trough 24. A discharge chute 26 is defined mid way between the end walls 20 and 22 in the bottom portion of the trough 24. An auger 28, having a shaft 30 and first and second screwblades 32 and 34, is mounted within the hopper 18 for floating rotation as will be described more fully hereafter.

The first auger blade 32 is adapted to drive cementious material such as concrete from the first end wall 20 toward the discharge opening 26 when the shaft is rotated clockwise as viewed from the end view of FIG. 3. The second screw blade 34 is adapted to drive cementious material such as concrete from the second end wall 22 toward the discharge opening 26 when the shaft 30 is rotated in the same direction (i.e. clockwise as viewed from the side view of FIG. 3). These blades 32 and 34 terminate at or prior to discharge opening 26 so as to maximize discharge of concrete through the opening 26 by reducing obstructions which might occur if the blades were continued over the opening 26. The separate blades 32 and 34 permit concrete to be moved from opposite ends of the hopper 18 by rotation of a single shaft 30.

An ear 33 is attached to the midsection of the shaft 30 for rotation therewith. The ear 33 functions to break up any jamming at the opening 26.

A frame 36 is rigidly connected to the hopper 18 and is adapted to slidably receive the conveyor 12 with the receiving end of the conveyor 35 mounted directly beneath the discharge opening 26 of the hopper 18. The frame includes arms 37 and 38 adapted to slide within channels 39 and 40 defined in side rails 41 and 42 of conveyor 12.

A two wheeled dolly 43 is provided to assist in transportation of the hopper 18. Dolly 43 includes a cross brace 44 adapted to fit under the conveyor 12. The brace 44 includes mounting brackets 45 and 46 extending outwardly therefrom and having eyelets 47 and 48 adapted to receive a connecting rod 50 therethrough. The rod 50 is inserted through eyelet 47, through holes (not shown) defined in the side rails 41 and 42 of conveyor 12 and through eyelet 48 of bracket 46. The cross brace 44 may thus pivot in relation to the conveyor 12 and hopper 18 about the longitudinal axis of rod 50.

Wheel mounting arms 52 and 53 extend below brace 44 and are connected thereto through plates 54 and 55 and extension mounts 56 and 58. Wheels 59 and 60 are rotatably mounted on the arms 52 and 53 respectively. When the cross brace 44 is pivoted, the wheels 59 and 60 are thus displaced in relation to the conveyor 12 and hopper 18.

Referring now to FIG. 5, a power means 76 in the form of a screw jack is pivotally connected at one end to a bracket 77 mounted on brace 44 and at the other end to hopper frame 36 at pivot 80. Power means (not shown) may be provided to automatically operate the screw jack 76 so that dolly 43 may be in the travel mode (dark lines of FIG. 3) or the operating mode (outline in FIG. 5).

In the travel mode, the wheels 59 and 60 ride on the ground and the hopper 18 is suspended thereabove. In the operating mode, screw jack 76 is extended until hopper 18 is permitted to ride on four hopper wheels 108 mounted directly below the hopper 18. The wheels 108 are rotatably mounted on wheel support members 110 and members 110 are rigidly connected to the underside of the hopper 18.

A motor 84 is rigidly mounted on the frame 36 for driving the auger 28. A motor drive shaft 86 is drivably connected by belt 88 to a transfer drive wheel 90 having a sprocketed drive shaft 92. A chain 94 drivably connects sprocketed drive shaft 92 to a sprocket wheel 96 connected to the auger shaft 30 of the auger 28. Accordingly, when the motor 84 is operated, the auger 28 and auger drive shaft 30 are caused to be rotated as a result of drivable connections through the belt 88 to the sprocketed drive shaft 92 and to the sprocketed wheel 96.

Centering members 100 and 102 are rigidly connected to the underside of the hopper as shown in FIG. 2. When side rails 41 and 42 of conveyor 12 are between the centering members 100 and 102, the discharge opening is positioned over conveyor belt 106. A discharge hood 104 is connected to the hopper below the discharge opening 26 to deliver cementious material and the like from the discharge opening 26 onto the conveyor belt 106.

Referring now to FIGS. 2 through 6, longitudinal channels 112 and 113 are defined in end walls 20 and 22 respectively. Channels 114 and 115 (not shown) are also defined in end walls 20 and 22 respectively. Elongate channels 114 and 115 extend from the upper curved surfaces 116 and 118 downwardly and communicate with the upper portions of the longitudinal channels 112 and 113. For assembly purposes, the auger 28 may be placed lengthwise over the hopper 18 with end portions of the auger shaft 30 extending outwardly through the elongate channels 114 and 115. The auger 28 may then be lowered until the end portions of the shaft 30 extend through the channels 112 and 113. Plates 117 and 119 may then be bolted over the channels 114 and 115 of end walls 20 and 22.

Arms 120 and 121 are pivotally connected for rotational movement about the axis of rotation of sprocketed drive shaft 92. Arm 120 extends from shaft 92 to one end of the auger shaft 30. Arm 121 is pivotally connected at the other side of hopper 18 to pivot means 122. Self-aligning bearings 123 and 124 are connected to the outer portion of the arms 120 and 121 respectively and are adapted for receiving end portions of the auger shaft 30 therein for rotation. Upper and lower flange members 125 and 126 respectively are connected to the end wall 20 as shown in FIG. 2. Similar flange members may also be connected to end wall 22. These flange members 125 and 126 limit upward and downward pivotal movement of the arm 120.

When the auger 28 is rotated by motor 84, stones and the like (e.g. 130) may become jammed between the auger blades 32 or 34 and the bottom surface of the hopper 18, tending to cause jamming of the auger during rotation. In this case, the auger 28 is permitted to float upwardly away from the bottom portion of the hopper 18 by means of the floating connection provided by pivotal arms 120 and 121 and related components as shown in FIG. 6. The auger 28 continues to rotate and operates to free the stone (e.g. 130). After the stone is displaced, the weight of the auger returns it to its normal position more nearly adjacent the bottom of the hopper 18 with flange 126 and a similar flange on end wall 22 (not shown) limiting downard travel of auger 28.

Because the channels 112 and 113 form circular arcs having a center located at the rotational axis of arm 120 and sprocketed drive shaft 92, the translational movement of the auger 28 within these channels does not appreciably affect the distance between the shaft 30 and shaft 92. Thus, constant tension is maintained by the drive chain 94, avoiding unnecessary slop and/or tension in the chain 94.

A gear reduction device may be used in place of the drive connections as shown in FIG. 5 in order to further simplify the operation and maintenance of the hopper 18.

Figure 7:
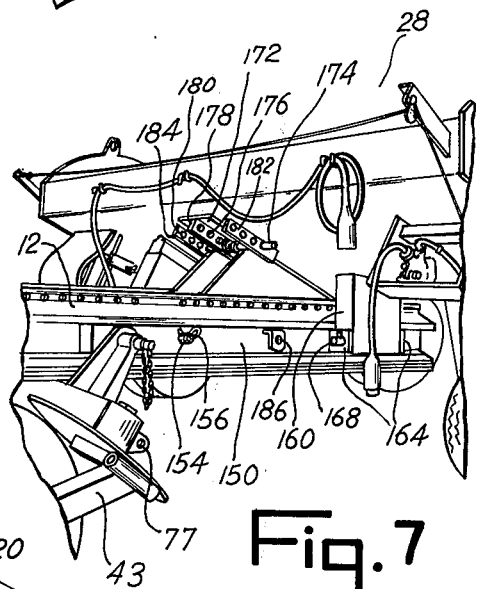
FIG. 7 is a perspective view of an alternative embodiment having modified means for connecting the auger hopper to the conveyor.

An alternative embodiment of the hopper mounting device is shown in FIG. 7. The hopper 18 of this embodiment is substantially the same as that of the embodiment shown in FIGS. 1–6. However, the hopper 18 of FIG. 7 may be lifted onto the conveyor and need not be slid on. The two wheeled dolly 43 is substantially the same as that of FIGS. 1–6. Side arms 150 and 152 (not shown) are inserted in channels 39 and 40 of the conveyor 12 and a pipe 154 is inserted through holes defined in the side arms 150 and 152 and side rails 41 and 42. Pins 156 and 158 (not shown) are inserted into pipe 154 to lock it in position.

The two wheeled dolly 43 is installed on the side arms substantially as described in relation to FIGS. 1–6. The hopper 18 is then lifted up and mounting legs 160 and 162 (not shown) rigidly connected to the underside of the hopper 18 are seated in U-shaped mounting brackets 164 and 166 (not shown) rigidly connected to side arms 150 and 152 respectively. Pins 168 and 170 (not shown) are inserted through bracket-leg 164-160 and bracket-leg 166-162 (not shown) respectively.

A hopper door 172 may be slid open or shut by means of a pin 174 inserted through any one of a plurality of holes 176 on a fin 178 defined on door 172. The pin 174 is held in place by insertion through holes 180 defined in side members 182 and 184.

A screw jack assembly (not shown in FIG. 7) may be connected between the hopper and bracket 77 of dolly 43 and operated as described above in relation to FIGS. 1–6.

The hopper 18 may be readily removed and a conventional hopper (not shown) may be substituted for the hopper 18. This is accomplished by rotating the dolly 43 toward the hopper and attaching a turnbuckle (not shown) between the dolly 43 and a bracket 186 on side arm 150. A similar turnbuckle should also be installed on the opposite side of the dolly 43. After removing the screw jack assembly, the hopper 18 may then be removed and replaced by a conventional hopper.

The hopper 18 is thus adapted for connection to the conveyor 12 with the longitudinal axis of the hopper 18 approximately horizontal and approximately perpendicular to the longitudinal axis of the conveyor 12 (i.e. to the direction of belt travel). This angular connection of the hopper 18 to the conveyor 12 permits the bed of hopper 18 to remain approximately horizontal regardless of the angular position of the conveyor 12. This avoids unnecessary tipping of the hopper thus avoiding concrete spills and facilitating full volume use of the hopper. This configuration also permits the hopper 18 to be maintained at near ground level so as to allow direct filling of the hopper from a ground level dump truck or concrete mixer.

This configuration also permits the auger 28 to have an approximately horizontal axis of rotation regardless of angular variation of the conveyor 12. Thus, the conveyor 12 may be raised or lowered as needed and the auger 28 continues to rotate about a horizontal axis driving concrete uniformly from both ends of conveyor 12.

While in the foregoing there have been described the preferred embodiments of this invention, it should be understood that these embodiments are merely illustrative of the principles of applicant's invention.

What is claimed is:

1. An auger hopper for delivering cementious material from a supply source to a conveyor, comprising, in combination:
    an elongated hopper having an input portion and a discharge portion, the discharge portion being narrower than the input portion and including first and second end walls, said end walls having first and second channels defined therein;
    a discharge opening defined in the delivery portion of the hopper and being substantially shorter than the elongate hopper;
    an auger having a shaft with first and second end sections and a screw blade thereon locatable in the narrow discharge portion of the hopper with the first section of the auger shaft having a sprocketed wheel connected thereto and located outside of the hopper adjacent the first end wall;
    a sprocketed drive shaft rotatably mounted on the hopper having an axis of rotation fixed with respect to translational movement in relation to the hopper side wall;
    first and second arms disposed adjacent the outer portions of the first and second end walls respectively and pivotably connected to the hopper for rotation about the axis of rotation of the sprocketed drive shaft;
    first and second bearing members on the first and second arms adapted to receive the first and second end sections of the auger shaft extending through the first and second longitudinal channels;
    drive chain means drivably connecting the sprocketed wheel on the auger shaft with the sprocketed drive shaft;
    whereby the auger may be rotated to drive cementious material toward the discharge opening and the auger may translate away from the narrow discharge portion of the hopper toward the wider input portion of the hopper when a hard lump tends to be lodged between the auger screw blade and the hopper to permit rotation of the hopper with a minimum of jamming and whereby the drive chain may be kept at a fixed tension and not pulled or loosened when the auger is translated during operation.

2. The combination as set forth in claim 1 wherein the screw blade includes first and second blade portions on the shaft adapted to drive cementious material within said hopper from the first and second end walls respectively and toward the discharge opening.

3. The combination as set forth in claim 2 wherein the first and second screw blade portions terminate at the discharge opening whereby the cementious material may be more readily discharged through the discharge opening.

4. The combination as set forth in claim 1 including means on the hopper for centering the conveyor directly under the discharge opening of the hopper.

5. The device as set forth in claim 1 wherein a slot is defined in at least one of the end walls and is adapted to receive one end of the auger whereby the auger may be readily mounted within the hopper.

6. The combination as set forth in claim 1 wherein the longitudinal channel defines an arc having a radius of curvature approximately equal to the distance between the rotational axes of the drive shaft and the auger shaft.

7. The combination as set forth in claim 1 including first wheel means rotatably connected to the hopper, second wheel means rotatably connected to the hopper and conveyor and having an axis of rotation movable in relation to the axis of rotation of said first wheel means and including means for moving said second wheel means to vary the distance between the axes of rotation of the first and second wheel means.

8. The combination as set forth in claim 1 including means for limiting the translational movement of the auger.

9. The combination as set forth in claim 1 including means for mounting the hopper astride the conveyor.

10. The device as set forth in claim 1 including an ear connected to the auger above the discharge opening whereby the ear rotates with the auger to break up jamming of cementious material at the discharge opening.

* * * * *